(12) United States Patent
Shoda et al.

(10) Patent No.: US 10,858,014 B2
(45) Date of Patent: Dec. 8, 2020

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Yasushi Shoda, Wako (JP); Junpei Noguchi, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/795,617

(22) Filed: Feb. 20, 2020

(65) Prior Publication Data

US 2020/0276982 A1 Sep. 3, 2020

(30) Foreign Application Priority Data

Feb. 28, 2019 (JP) ................ 2019-036333

(51) Int. Cl.
| | |
|---|---|
| *B60W 50/14* | (2020.01) |
| *B60W 30/06* | (2006.01) |
| *B60R 16/03* | (2006.01) |
| *B60W 60/00* | (2020.01) |
| *G06K 9/00* | (2006.01) |

(52) U.S. Cl.
CPC ........... *B60W 50/14* (2013.01); *B60W 30/06* (2013.01); *B60W 60/0023* (2020.02); *B60W 2510/244* (2013.01); *B60W 2530/209* (2020.02); *G06K 9/00812* (2013.01)

(58) Field of Classification Search
CPC ..................................... H02J 7/0027
See application file for complete search history.

(56) References Cited

U.S. PATENT DOCUMENTS

| 2011/0266996 A1* | 11/2011 | Sugano ............... B60L 53/53 320/104 |
| 2013/0009599 A1* | 1/2013 | Yukizane ............ B60L 53/63 320/109 |

(Continued)

FOREIGN PATENT DOCUMENTS

JP 2017-182263 10/2017

*Primary Examiner* — Joseph H Feild
*Assistant Examiner* — Pameshanand Mahase
(74) *Attorney, Agent, or Firm* — Amin, Turocy & Watson, LLP

(57) ABSTRACT

A vehicle control system of an embodiment includes a recognizer that recognizes a peripheral environment of a vehicle, a driving controller that performs driving control based on speed control and steering control of the vehicle on the basis of a recognition result of the recognizer, an acquirer that acquires a remaining energy amount of a terminal device, and a notifier that performs a notification for prompting an increase of the remaining energy amount when the remaining energy amount acquired by the acquirer while an occupant is aboard the vehicle is less than a first threshold in a case where an instruction to cause a vehicle to enter a parking area in which the vehicle is able to be parked by traveling based on the driving control or an instruction to cause the vehicle to exit the parking area is performed by the terminal device.

11 Claims, 10 Drawing Sheets

(56) References Cited

U.S. PATENT DOCUMENTS

| 2014/0214242 | A1* | 7/2014 | Seo | B60L 58/13 |
| | | | | 701/2 |
| 2019/0205842 | A1* | 7/2019 | Starns | B60L 53/65 |
| 2019/0275892 | A1* | 9/2019 | Williams | B60L 53/66 |

* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2019-036333, filed Feb. 28, 2019, the content of which is incorporated herein by reference.

BACKGROUND

Field of the Invention

The present invention relates to a vehicle control system, a vehicle control method, and a storage medium.

Description of Related Art

In recent years, there has been progress in research for automatic control of a vehicle. In connection with this, a technique including a first means for detecting information on parking availability of individual parking spaces, searching for a route to a parking space, and automatically parking a vehicle in a parking space on the basis of information on the route to the parking position found through the search, a second means for informing a parking lot user of information relating to a parking position through a portable terminal, and a third means for searching for an empty space as close to a condition as possible on the basis of facility excursion information of the parking lot user, and reflecting the empty space found through the search in the first means is known (for example, Japanese Unexamined Patent Application, First Publication No. 2017-182263).

SUMMARY OF THE INVENTION

However, in the related art, in a case where the remaining battery amount of an occupant's terminal device is insufficient, there is a chance that it will not be possible for the terminal device to issue an instruction for parking to a vehicle, or for the terminal device to acquire information from the vehicle.

The present invention was contrived in view of such circumstances, and one object thereof is to provide a vehicle control system, a vehicle control method, and a storage medium that make it possible to suppress a situation in which communication with a terminal device that performs an instruction for parking cannot be performed.

A vehicle control system, a vehicle control method, and a storage medium according to this invention have the following configurations adopted therein.

(1) According to an aspect of this invention, there is provided a vehicle control system including: a recognizer that recognizes a peripheral environment of a vehicle; a driving controller that performs driving control based on speed control and steering control of the vehicle on the basis of a recognition result of the recognizer; an acquirer that acquires a remaining energy amount of a terminal device; and a notifier that performs a notification for prompting an increase of the remaining energy amount when the remaining energy amount acquired by the acquirer while an occupant is aboard the vehicle is less than a first threshold in a case where an instruction to cause a vehicle to enter a parking area in which the vehicle is able to be parked by traveling based on the driving control or an instruction to cause the vehicle to exit the parking area is performed by the terminal device.

(2) In the aspect of the above (1), in a case where the vehicle arrives at the parking area without the increase of the remaining energy amount while an occupant is aboard the vehicle, the notifier notifies that the driving control according to an instruction from the terminal device is not able to be executed before the occupant exits the vehicle.

(3) In the aspect of the above (1), the notifier performs the notification to one or both of the vehicle and the terminal device.

(4) In the aspect of the above (1), the acquirer acquires a remaining energy amount of a terminal device after an occupant exits the vehicle, and the notifier notifies the terminal device that an instruction for exiting of the vehicle is not able to be performed when the remaining energy amount is less than the first threshold.

(5) In the aspect of the above (4), the notifier performs a notification for warning the terminal device that the instruction for exiting of the vehicle is not able to be performed when the remaining energy amount is less than a second threshold larger than the first threshold.

(6) In the aspect of the above (4), the notifier notifies the terminal device of information relating to a remaining energy amount with which the instruction for exiting of the vehicle is able to be performed.

(7) In the aspect of the above (4), the notifier notifies the terminal device of information relating to a parking position of the vehicle.

(8) In the aspect of the above (4), the notifier notifies the terminal device that the instruction for exiting of the vehicle is able to be performed when the remaining energy amount acquired by the acquirer is equal to or greater than the first threshold after the terminal device is notified that the instruction for exiting of the vehicle is not able to be performed.

(9) In the aspect of the above (1), the driving controller causes the vehicle to exit the parking area by the driving control in a case where the exiting instruction from the terminal device is received when the remaining energy amount acquired by the acquirer is equal to or greater than the first threshold.

(10) According to an aspect of this invention, there is provided a vehicle control method including causing a computer to: recognize a peripheral environment of a vehicle; perform driving control based on speed control and steering control of the vehicle on the basis of a recognition result, acquire a remaining energy amount of a terminal device; and perform a notification for prompting an increase of the remaining energy amount when the acquired remaining energy amount is less than a first threshold in a case where an instruction to cause a vehicle to enter a parking area in which the vehicle is able to be parked by traveling based on the driving control or an instruction to cause the vehicle to exit the parking area is performed by the terminal device.

(11) According to an aspect of this invention, there is provided a computer readable non-transitory storage medium having a program stored therein, the program causing a computer to: recognize a peripheral environment of a vehicle; perform driving control based on speed control and steering control of the vehicle on the basis of a recognition result, acquire a remaining energy amount of a terminal device; and perform a notification for prompting an increase of the remaining energy amount when the acquired remaining energy amount is less than a first threshold in a case where an instruction to cause a vehicle to enter a parking area in which the vehicle is able to be parked by traveling based on the driving control or an instruction to cause the vehicle to exit the parking area is performed by the terminal device.

According to the aspects of the above (1) to (11), it is possible to suppress a situation in which a terminal device that performs an instruction for parking cannot perform communication.

DETAILED DESCRIPTION OF EMBODIMENTS

Hereinafter, an embodiment of a vehicle control system, a vehicle control method, and a storage medium of the present invention will be described with reference to the accompanying drawings. Hereinafter, as an example, an embodiment in which a vehicle control system is applied to an automated driving vehicle will be described. The term "automated driving" refers to, for example, automatically controlling one or both of the steering and acceleration or deceleration of a vehicle and executing driving control. The automated driving vehicle may be configured such that driving control is executed by an occupant's manual operation.

[Overall Configuration]

Figure 1:
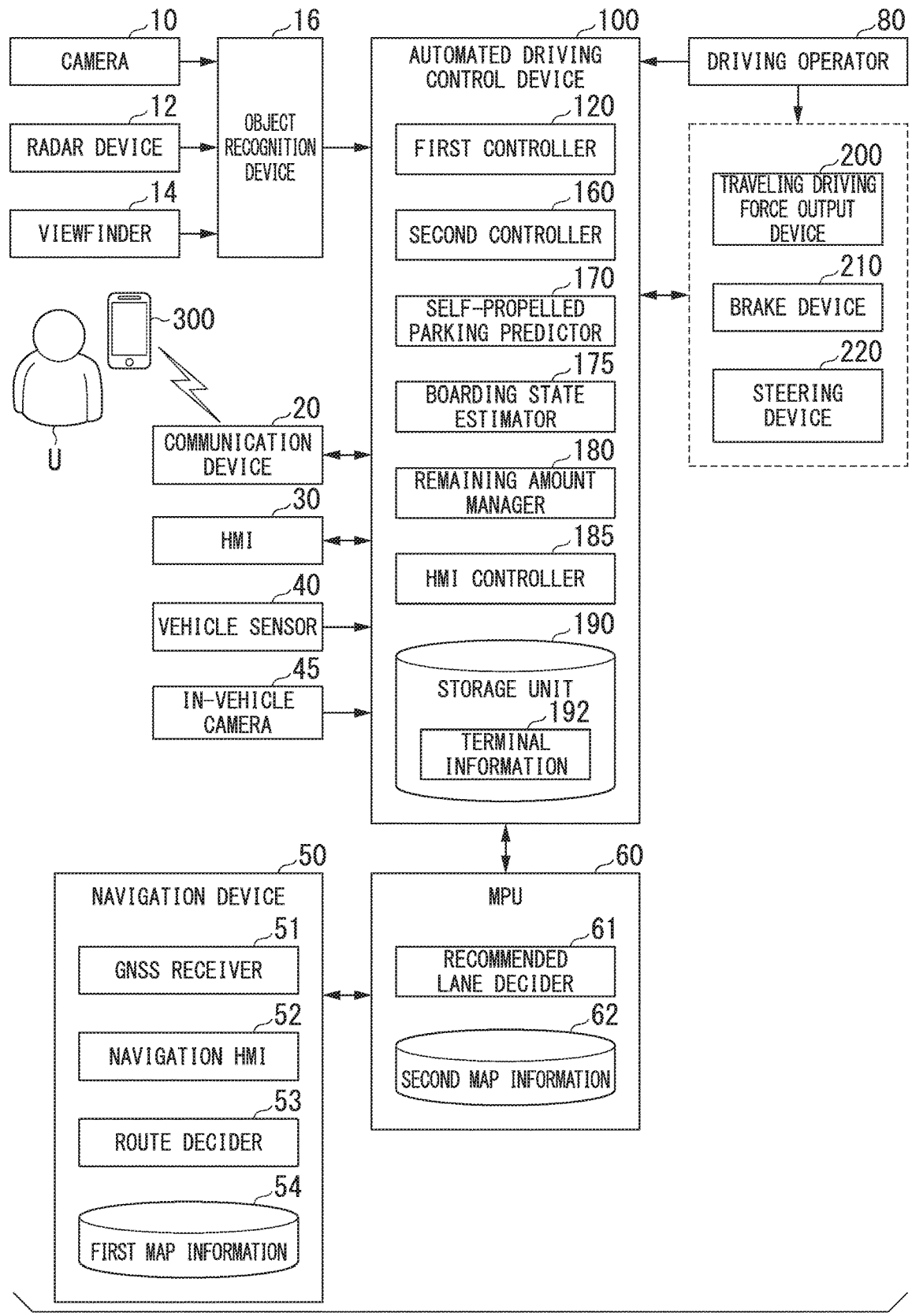
FIG. 1 is a configuration diagram of a vehicle system using a vehicle control system according to an embodiment.

FIG. 1 is a configuration diagram of a vehicle system 1 using the vehicle control system according to the embodiment. A vehicle having the vehicle system 1 mounted therein is, for example, a two-wheeled, three-wheeled, or four-wheeled vehicle or the like, and the driving source is an internal-combustion engine such as a diesel engine, a gasoline engine, or a hydrogen engine, an electric motor, or a combination thereof. The electric motor operates using power generated by a generator connected to an internal-combustion engine or power discharged from a battery such as a secondary battery or a fuel battery (a storage battery).

The vehicle system 1 includes, for example, a camera 10, a radar device 12, a viewfinder 14, an object recognition device 16, a communication device 20, human machine interface (HMI) 30, a vehicle sensor 40, an in-vehicle camera 45, a navigation device 50, a map positioning unit (MPU) 60, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added. For example, a combination of the communication device 20, the HMI 30, the in-vehicle camera 45, and the automated driving control device 100 is an example of the "vehicle control system." The automated driving control device 100 is an example of a "driving controller." A remaining amount manager 180 is an example of an "acquirer." A combination of the HMI 30 and an HMI controller 185 is an example of a "notifier."

The camera 10 is a digital camera using a solid-state imaging element such as, for example, a charge coupled device (CCD) or a complementary metal oxide semiconductor (CMOS). The camera 10 is installed at any points on a vehicle having the vehicle system 1 mounted therein (hereinafter referred to as a vehicle M). In a case where a forward image is captured, the camera 10 is installed on the upper portion of the front windshield, the rear surface of the rear-view mirror, or the like. The camera 10, for example, repeatedly captures an image of the vicinity of the vehicle M periodically. The camera 10 may be a stereo camera.

The radar device 12 radiates radio waves such as millimeter waves to the vicinity of the vehicle M, and detects radio waves (reflected waves) reflected from an object to detect at least the position (distance to and orientation of) of the object. The radar device 12 is installed at any points on the vehicle M. The radar device 12 may detect the position and speed of an object with a frequency modulated continuous wave (FM-CW) system.

The viewfinder 14 is a light detection and ranging (LIDAR) viewfinder. The viewfinder 14 irradiates the vicinity of the vehicle M with light, and measures scattered light. The viewfinder 14 detects a distance to an object on the basis of a time from light emission to light reception. The irradiation light is, for example, pulsed laser light. The viewfinder 14 is installed at any points on the vehicle M.

The object recognition device 16 recognizes the position, type, speed, or the like of an object by performing a sensor fusion process on detection results based on some or all of the camera 10, the radar device 12, and the viewfinder 14. The object recognition device 16 outputs a recognition result to the automated driving control device 100. The object recognition device 16 may output the detection results of the camera 10, the radar device 12, and the viewfinder 14, as they are, to the automated driving control device 100. The object recognition device 16 may be omitted from the vehicle system 1.

The communication device 20 communicates with, for example, a terminal device 300 used by an occupant U of the vehicle M, another vehicle which is present in the vicinity of the vehicle M, a parking lot management device (to be described above), or various server devices using, for example, a cellular network, a Wi-Fi network, Bluetooth (registered trademark), dedicated short range communication (DSRC), or the like. The terminal device 300 is, for example, a portable terminal such as a smartphone or a tablet terminal which is possessed by the occupant U, but may be a management terminal, a server device, or the like which is used by a manager or the like set in advance without being limited thereto. In the following description, the terminal device 300 is assumed to be a terminal which is possessed by an occupant.

The HMI 30 presents various types of information to an occupant of the vehicle M, and receives the occupant's input operation. The HMI 30 includes a display device, a speaker, a buzzer, a touch panel, a switch, a key, and the like. An example of the display device includes a meter display provided on a portion facing a driver in an instrument panel, a center display provided at the center of the instrument panel, a head up display (HUD), or the like. The HUD is, for example, a device for visually recognizing an image by superimposing the image on a landscape, and allows an occupant to visually recognize a virtual image, as an example, by projecting light including an image onto the front windshield or the combiner of the vehicle M.

The vehicle sensor 40 includes a vehicle speed sensor that detects the speed of the vehicle M, an acceleration sensor that detects an acceleration, a yaw rate sensor that detects an angular velocity around a vertical axis, an orientation sensor that detects the direction of the vehicle M, or the like. The vehicle sensor 40 may include a load sensor that detects a load to each in-vehicle seat. A result detected by the vehicle sensor 40 is output to the automated driving control device 100.

The in-vehicle camera 45 is a digital camera using a solid-state imaging element such as, for example, a CCD or a CMOS. The in-vehicle camera 45 captures an image of a region in the vicinity of each in-vehicle seat. The in-vehicle camera 45 captures an image, for example, at a predetermined timing or in a predetermined period. A captured image of the in-vehicle camera 45 is output to the automated driving control device 100.

The navigation device 50 includes, for example, a global navigation satellite system (GNSS) receiver 51, a navigation HMI 52, and a route decider 53. The navigation device 50 holds first map information 54 in a storage device such as a hard disk drive (HDD) or a flash memory. The GNSS receiver 51 specifies the position of the vehicle M on the basis of a signal received from a GNSS satellite. The position of the vehicle M may be specified or complemented by an inertial navigation system (INS) in which an output of the vehicle sensor 40 is used. The navigation HMI 52 includes a display device, a speaker, a touch panel, a key, or the like. The navigation HMI 52 may be partly or wholly shared with the above-described HMI 30. The route decider 53 decides, for example, a route (hereinafter, a route on a map) from the position (or any input position) of the vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by, for example, the function of the terminal device 300 of the occupant U. The navigation device 50 may transmit its current position and destination to a navigation server through the communication device 20, and acquire the same route as the route on a map from the navigation server. The navigation device 50 outputs the decided route on a map to the MPU 60.

The MPU 60 includes, for example, a recommended lane decider 61, and holds second map information 62 in a storage device such as an HDD or a flash memory. The recommended lane decider 61 divides the route on a map provided from the navigation device 50 into a plurality of blocks (for example, divides the route on a map every 100 [m] in a vehicle traveling direction), and decides a recommended lane for each block with reference to the second map information 62. The recommended lane decider 61 makes a decision on which lane from the left to travel in. In a case where a branch point is present in the route on a map, the recommended lane decider 61 decides a recommended lane so that the vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, parking lot information, telephone number information, or the like. The parking lot information is, for example, the position or shape of a parking space for parking a vehicle, the number of vehicles that can be parked, the feasibility of manned travel, the feasibility of unmanned travel, or the like. The second map information 62 may be updated at any time by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first controller 120, a second controller 160, a self-propelled parking predictor 170, a boarding state estimator 175, the remaining amount manager 180, the HMI controller 185, and a storage unit 190. The first controller 120, the second controller 160, the self-propelled parking predictor 170, the boarding state estimator 175, the remaining amount manager 180, and the HMI controller 185 are each realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device.

Figure 2:
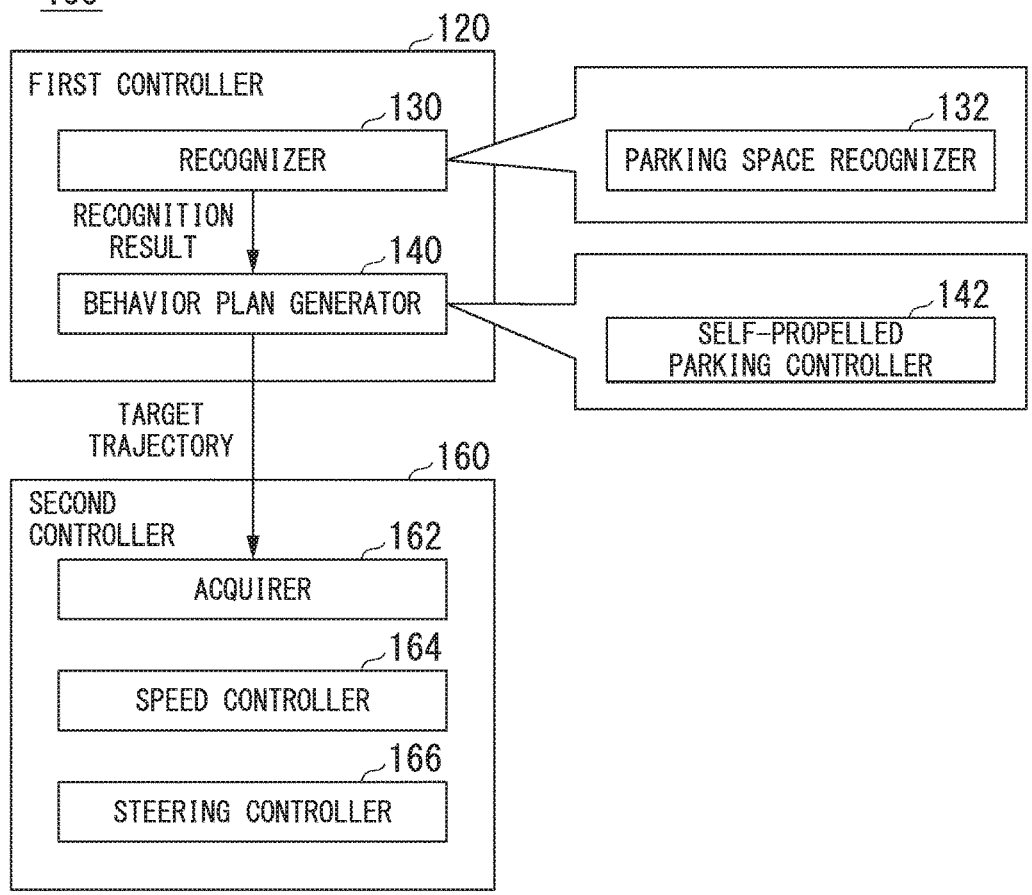
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognizer 130 recognizes the position and speed of an object near the vehicle M, and the state of acceleration or the like on the basis of information which is input from the camera 10, the radar device 12, and the viewfinder 14 through the object recognition device 16. The position of the object is recognized as, for example, a position in absolute coordinates with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes, for example, a lane (traveling lane) along which the vehicle M travels. For example, the recognizer 130 may recognize a traveling lane by comparing a pattern of a road partition line (for example, an array of solid lines and broken lines) obtained from the second map information 62 with a pattern of a road partition line located in the vicinity of the vehicle M which is recognized from an image captured by the camera 10. The recognizer 130 may recognize a traveling lane by recognizing a driving boundary (road boundary) including a road partition line, a shoulder, a curbstone, a median strip, a guardrail, or the like without being limited to the recognition of a road partition line. In this recognition, the position of the vehicle M acquired from the navigation device 50 or processing results based on an INS may be added. The recognizer 130 recognizes a stop line, an obstacle, a red light, a tollbooth, an entrance/exit gate of a parking lot, and other road events.

Upon recognizing a traveling lane, the recognizer 130 recognizes the position or posture of the vehicle M with respect to the traveling lane. The recognizer 130 may recognize, for example, deviation of the vehicle M from the center of the lane which is a reference point, and an angle formed with respect to a line aligned along the center of the lane of the vehicle M in its traveling direction, as the relative position and posture of the vehicle M with respect to the traveling lane. Instead, the recognizer 130 may recognize the position of the reference point of the vehicle M or the like with respect to either lateral end portion (a road partition line or a road boundary) of the traveling lane, as the relative position of the vehicle M with respect to the traveling lane.

The recognizer 130 includes a parking space recognizer 132 which is started up in a self-propelled parking event to be described later. The details of the function of the parking space recognizer 132 will be described later.

The behavior plan generator 140 generates a target trajectory along which the vehicle M will travel in the future automatically (irrespective of a driver's operation) so that the vehicle M travels in the recommended lane decided by the recommended lane decider 61 in principle and can cope with the peripheral situation of the vehicle. The target trajectory includes, for example, a speed element. For example, the target trajectory may be represented as a trajectory obtained by arranging points (trajectory points) at which the vehicle M will arrive in order. The trajectory points are points at which the vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the vehicle M will arrive at sampling times for respective predetermined sampling times. In this case, information of a target speed or target acceleration is represented by an interval between trajectory points.

The behavior plan generator 140 may set automated driving events when generating a target trajectory. Examples of the automated driving events include a constant-speed traveling event, a low-speed following traveling event, a lane change event, a diverging event, a merging event, an overtaking event, a self-propelled parking event of performing automated travel and parking at a parking lot such as valet parking, and the like. The automated travel involves, for example, traveling based on automated driving. An example of the automated travel includes unmanned travel. The behavior plan generator 140 generates a target trajectory according a started-up event. The behavior plan generator 140 includes a self-propelled parking controller 142 to be started up in a case where the self-propelled parking event is executed. The details of the function of the self-propelled parking controller 142 will be described later.

The second controller 160 controls the traveling driving force output device 200, the brake device 210, and the steering device 220 so that the host vehicle M passes along the target trajectory generated by the behavior plan generation unit 140 according to scheduled times. The second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the vehicle M and feedback control based on deviation from the target trajectory.

Referring back to FIG. 1, the self-propelled parking predictor 170 predicts whether an execution instruction for the self-propelled parking event is performed by the terminal device 300. The details of the function of the self-propelled parking predictor 170 will be described later.

The boarding state estimator 175 estimates the boarding state of the occupant U. For example, the boarding state estimator 175 estimates whether the occupant U is on board on the basis of information from the vehicle sensor 40 or the in-vehicle camera 45. For example, in a case where a load value detected from a load sensor provided on a seat is equal to or greater than a predetermined value, the boarding state estimator 175 estimates that the occupant U is on board. In addition, in a case where a load value detected from the load sensor is less than the predetermined value, the boarding state estimator 175 estimates that the occupant U is not on board. The boarding state estimator 175 may analyze an image captured by the in-vehicle camera 45, estimate that the occupant U is on board in a case where feature information (for example, the contour of eyes, nose, mouth, or face) of the face, contour information of the body (the upper half of the body), or the like is extracted from the captured image, and estimate that the occupant U is not on board in a case where the feature information of the face, the contour information, or the like is not extracted.

The boarding state estimator 175 may estimate whether the occupant U performs manual driving. For example, the boarding state estimator 175 estimates that the occupant U performs manual driving in a case where driving control based on the operation of the driving operator 80 is performed, or a case where automated driving performed by the first controller 120 and the second controller 160 is not executed. The boarding state estimator 175 may estimate that the occupant U performs manual driving in a case where it is detected by the vehicle sensor 40 that the occupant U sits on a driver's seat, and it is estimated that the occupant U operates the driving operator on the basis of the analysis result of the captured image of the in-vehicle camera 45.

The remaining amount manager 180 manages the remaining energy amount of the terminal device 300. The remaining energy amount is, for example, the remaining amount (remaining battery amount) of a storage battery (battery) that supplies power to the terminal device 300. The storage battery may be built into the terminal device 300, or may be external type. In the following description, a remaining battery amount is used as an example of the remaining energy amount of the terminal device 300. The remaining battery amount is, for example, a state of charge (SOC) of a battery. The remaining amount manager 180 acquires information relating to the terminal device 300 associated with the vehicle M from terminal information 192 stored in the storage unit 190. The terminal information 192 includes, for example, a terminal ID which is identification information for identifying the terminal device 300, address information for communicating with the terminal device 300, or the like. The terminal information 192 may include address information of a terminal device which is used by each of a plurality of occupants who board the vehicle M. The remaining amount manager 180 acquires address information of a terminal device of an occupant who is predicted to be on board or to be on board in the future out of the address information acquired from the terminal information 192, queries the terminal device 300 about the remaining battery amount through the communication device 20 on the basis of the acquired address information, and acquires the remaining battery amount from the terminal device 300. The remaining amount manager 180 may acquire the remaining battery amount which is transmitted in a predetermined period or at a timing from the terminal device 300.

The remaining amount manager 180 causes the HMI controller 185 to execute a predetermined notification on the basis of the acquired remaining battery amount, or causes the first controller 120 and the second controller 160 to execute automated driving based on an instruction from the terminal device 300. The details of the function of the remaining amount manager 180 will be described later.

The HMI controller 185 causes the HMI 30 to notify an occupant of predetermined information. The predetermined information is, for example, information relating to the remaining battery amount of the terminal device 300. The predetermined information may include information associated with traveling of the vehicle M such as information relating to the state of the vehicle M or information relating to driving control. The information relating to the state of the vehicle M includes, for example, the speed, engine speed, shift position, or the like of the vehicle M. The information relating to driving control includes, for example, the presence or absence of execution of automated driving, information relating to the degree of driving assistance based on automated driving, or the like. The predetermined information may include information which is not associated with traveling of the vehicle M such as a television program or content (for example, a move) stored in a storage medium such as a DVD. The HMI controller 185 may output information received by the HMI 30 to the communication device 20, the navigation device 50, the first controller 120, or the like.

The HMI controller 185 may communicate with the terminal device 300 through the communication device 20, and output information acquired from the terminal device 300 to the HMI 30. The HMI controller 185 may transmit information generated on the basis of information obtained by the remaining amount manager 180 to the terminal device 300 or another external device through the communication device 20.

The HMI controller 185 may cause a display device of the HMI 30 to display a registration screen for registering the terminal device 300 that communicates with the vehicle M, and perform control for storing information (for example, address information) relating to the terminal device registered from the registration screen in the terminal information 192. The terminal device 300 that communicates with the vehicle M is, for example, terminal device that gives an entry instruction, an exit instruction, or the like to the vehicle M in a case where the vehicle M is caused to enter or exit a parking area by automated driving in the self-propelled parking event (in the case of self-propelled parking). The registration of the above-described the terminal device 300 is executed, for example, while an occupant is aboard the vehicle or at a predetermined timing before self-propelled parking is started. The registration of the above-described the terminal device 300 may be performed an application program (a vehicle cooperation application to be described later) installed in the terminal device 300.

The storage unit 190 is realized by, for example, an HDD, a flash memory, an EEPROM, a read only memory (ROM), a random access memory (RAM), or the like. The storage unit 190 stores, for example, the terminal information 192 and other information.

The traveling driving force output device 200 includes an engine and an engine electronic control unit (ECU) that controls the engine, for example, in a case where the host vehicle M is an automobile using an internal-combustion engine as a motive power source. The engine ECU adjusts the throttle position, shift step, or the like of the engine in accordance with information which input from the second controller 160 or information which input from the driving operator 80, and outputs a traveling driving force (torque) in order for the vehicle M to travel.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which input from the second controller 160 or the information which input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Terminal Device 300]

Figure 3:
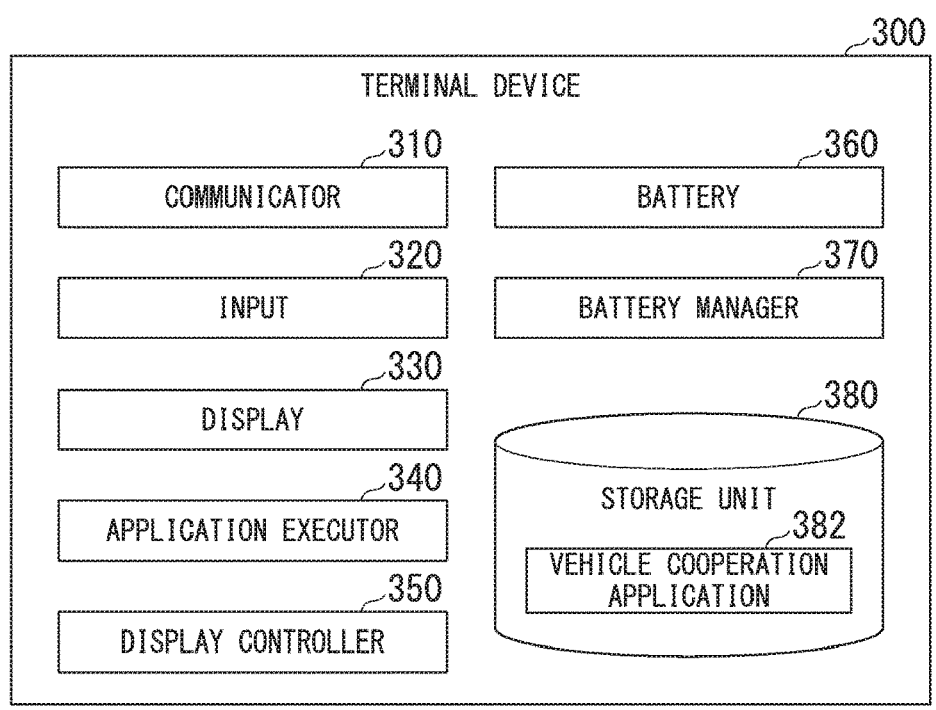
FIG. 3 is a diagram illustrating an example of a functional configuration of a terminal device.

FIG. 3 is a diagram illustrating an example of a functional configuration of the terminal device 300. The terminal device 300 includes, for example, a communicator 310, an input 320, a display 330, an application executor 340, a display controller 350, a battery (an example of a storage battery) 360, a battery manager 370, and a storage unit 380. The communicator 310, the input 320, the display 330, the application executor 340, the display controller 350, and the battery manager 370 are realized by a hardware processor such as, for example, a CPU executing a program (software). Some or all of these components may be realized by hardware (a circuit unit; including circuitry) such as an LSI, an ASIC, an FPGA, or a GPU, or may be realized by software and hardware in cooperation. The above-described program may be stored in, for example, a storage device such as an HDD or a flash memory included in the terminal device 300 in advance (a storage device including a non-transitory storage medium), may be stored in a detachable storage medium such as a DVD or a CD-ROM, or may be installed in the storage unit 380 by the storage medium (the non-transitory storage medium) being mounted in a drive device.

The communicator 310 communicates with the vehicle M or another external device, for example, through a local area network (LAN), a wide area network (WAN), or a network of the Internet.

The input 320 receives, for example, a user's (for example, the occupant U's) input based on the operation of various keys, buttons, or the like. The display 330 is, for example, a liquid crystal display (LCD). The input 320 may be formed integrally with the display 330 as a touch panel.

The application executor 340 is realized by the execution of a vehicle cooperation application 382 stored in the storage unit 380. The vehicle cooperation application 382 is, for example, an application program for communicating with the vehicle M through a network and transmitting information relating to instructions for entry and exit in self-propelled parking or the remaining battery amount of the terminal device 300 (more specifically, the remaining battery amount of the battery 360) to the vehicle M. The transmission of the remaining battery amount is managed by the battery manager 370, and is performed in a predetermined period or at a timing when a query of the remaining battery amount from the vehicle M is received. The vehicle cooperation application 382 may perform control for acquiring information transmitted by the vehicle M and displaying the acquired information on the display 330. The vehicle cooperation application 382 may perform control for displaying an image on the display 330 on the basis of information received by the input 320 or terminating display of the image displayed on the display 330. The vehicle cooperation application 382 may perform the registration of the terminal device 300 or the occupant U with the vehicle M, or perform a process relating to other vehicle cooperation.

The display controller 350 controls content displayed on the display 330 or a display timing.

For example, the display controller 350 generates an image for displaying information executed by the application executor 340 on the display 330, and causes the display 330 to display the generated image. The display controller 350 may generate a voice associated with some or all of the content displayed on the display 330, and output the generated voice to a speaker (not shown) of the terminal device. The display controller 350 may cause the display 330 to display an image received from the vehicle M or to output a voice received from the vehicle M to the speaker.

The battery 360 supplies power to each component of the terminal device 300. The battery 360 is a secondary battery such as, for example, a lithium-ion battery. The battery 360 that is used may be any battery which is capable of charging and discharging. The battery 360 is charged and discharged by control of the battery manager 370. The battery 360 is configured to be attachable to and detachable from the main body of the terminal device, and thus can be replaced with another battery.

The battery manager 370 manages the remaining battery amount or charging and discharging of the battery 360. For example, the battery manager 370 measures the terminal voltage of the battery 360, and acquires the remaining battery amount on the basis of the magnitude of the measured terminal voltage. The battery manager 370 may acquire the remaining battery amount, for example, by integrating the amount of current accumulated during charging using a current detection resistor and obtaining the amount of current which is output during discharging. The battery manager 370 may, for example, store a database such as the discharging characteristics or temperature characteristics of the battery 360 in the storage unit 380 or the like in advance, and acquire the remaining amount on the basis of the measured voltage value or current value and the database. The battery manager 370 may combine some or all of the above-described acquisition methods.

The battery manager 370 updates the remaining battery amount in a predetermined timing or at a predetermined period. The predetermined timing is, for example, a timing at which the remaining battery amount of the battery 360 is queried from the vehicle M, a timing at which it is detected that the position of the terminal device 300 or the vehicle M has reached a predetermined point, a timing at which an occupant boards a vehicle, or the like. The predetermined point is a parking area of a visit destination facility, or a point where the traveling distance of the vehicle M from a point in time updated previously reaches a predetermined distance.

The storage unit 380 is realized by, for example, an HDD, a flash memory, an EEPROM, a ROM, a RAM, or the like.

The storage unit 380 stores, for example, the vehicle cooperation application 382 and other information.

Next, driving control of the vehicle M in the embodiment will be described in detail. Hereinafter, as an example of a situation in which driving control of the vehicle M is executed, a situation in which self-propelled parking is performed through unmanned travel in valet parking of a visit destination facility will be described.

Figure 4:
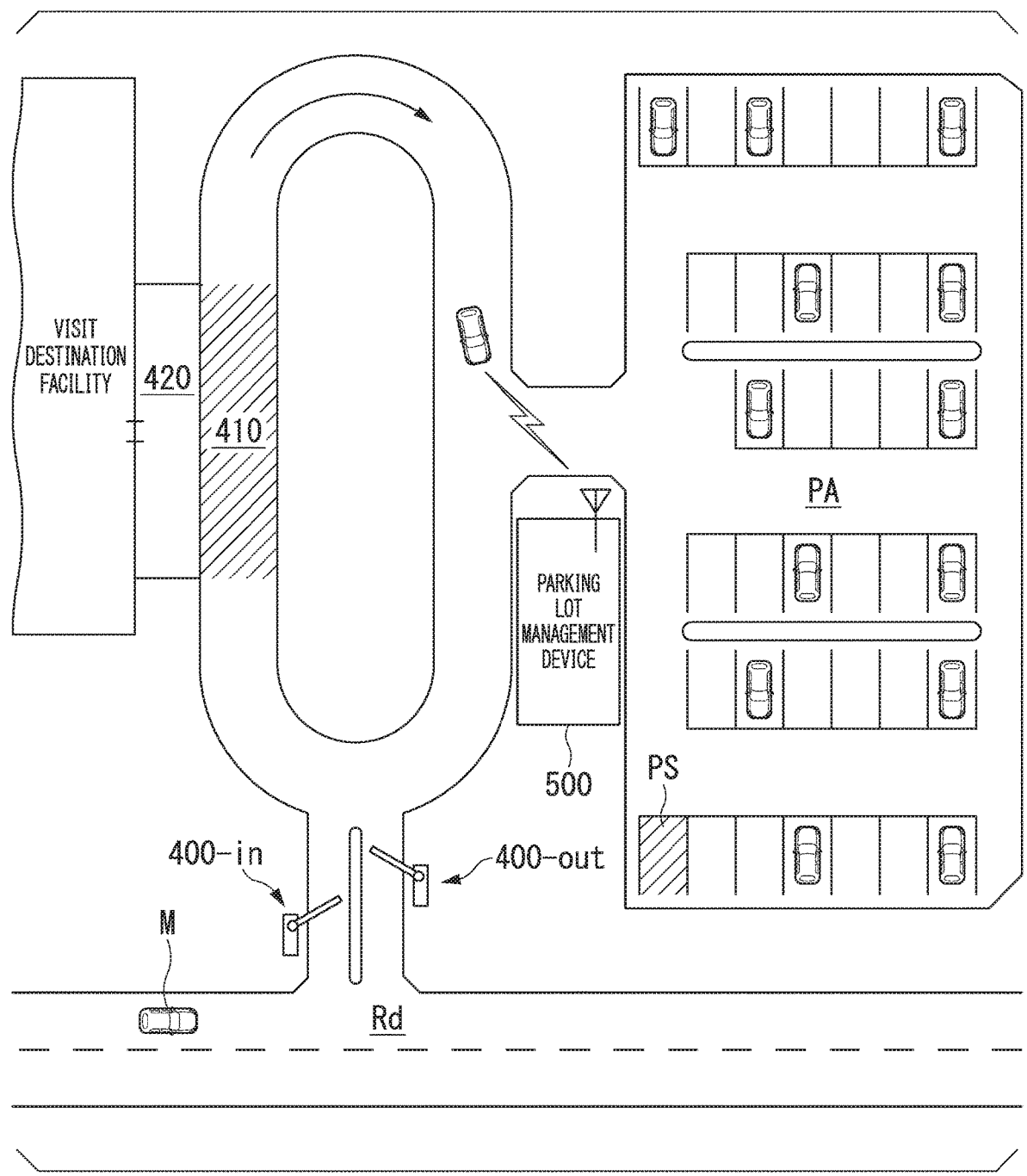
FIG. 4 is a diagram schematically illustrating a situation in which a self-propelled parking event in the embodiment is executed.

FIG. 4 is a diagram schematically illustrating a situation in which a self-propelled parking event in the embodiment is executed. In the example of FIG. 4, a parking area (for example, a valet parking area) PA of a visit destination facility is shown. The parking area PA is, for example, an area in which a vehicle can be caused to travel or be parked using automated driving. The parking area PA is assumed to be, for example, a region in which traveling is possible using unmanned travel and manned travel, and a region through which an occupant of a vehicle is allowed to pass. An example of the manned travel includes traveling based on manual driving, or traveling based on automated driving in a state in which an occupant is on board.

The parking area PA is provided with, for example, gates 400-in and 400-out, a stop area 410, and a boarding and exit area 420 on a route from a road Rd to a visit destination facility. In the example of FIG. 4, a parking lot management device 500 that manages the parking situation of the parking area PA and transmits availability or the like to a vehicle is assumed to be provided.

Here, processes during entry and exit of the vehicle M based on the self-propelled parking event will be described. The processes during entry and exit are executed, for example, when an entry instruction or an exit instruction is received from the terminal device 300 of which the battery 360 does not have an insufficient remaining battery amount, or when other execution conditions are satisfied.

[Self-Propelled Parking Event—During Entry]

The self-propelled parking controller 142 parks the vehicle M within the parking space of the parking area PA, for example, on the basis of information acquired from the parking lot management device 500 by the communication device 20. In this case, the vehicle M advances to the stop area 410 through the gate 400-in by manual driving or automated driving. The stop area 410 faces the boarding and exit area 420 which is connected to the visit destination facility. The boarding and exit area 420 may be provided with eaves for blocking rain or snow.

The vehicle M performs automated driving after the occupant U exits the vehicle in the stop area 410, and starts the self-propelled parking event for movement to a parking space PS within the parking area PA. A start trigger of the self-propelled parking event may be, for example, some kind of operation performed by the occupant U (for example, an entry instruction from the terminal device 300), or may be wireless reception of a predetermined signal from the parking lot management device 500. In a case where the self-propelled parking event is started, the self-propelled parking controller 142 controls the communication device 20 and transmits a request for parking toward the parking lot management device 500. The vehicle M moves from the stop area 410 to the parking area PA in accordance with the guidance of the parking lot management device 500 or while performing sensing by itself.

Figure 5:
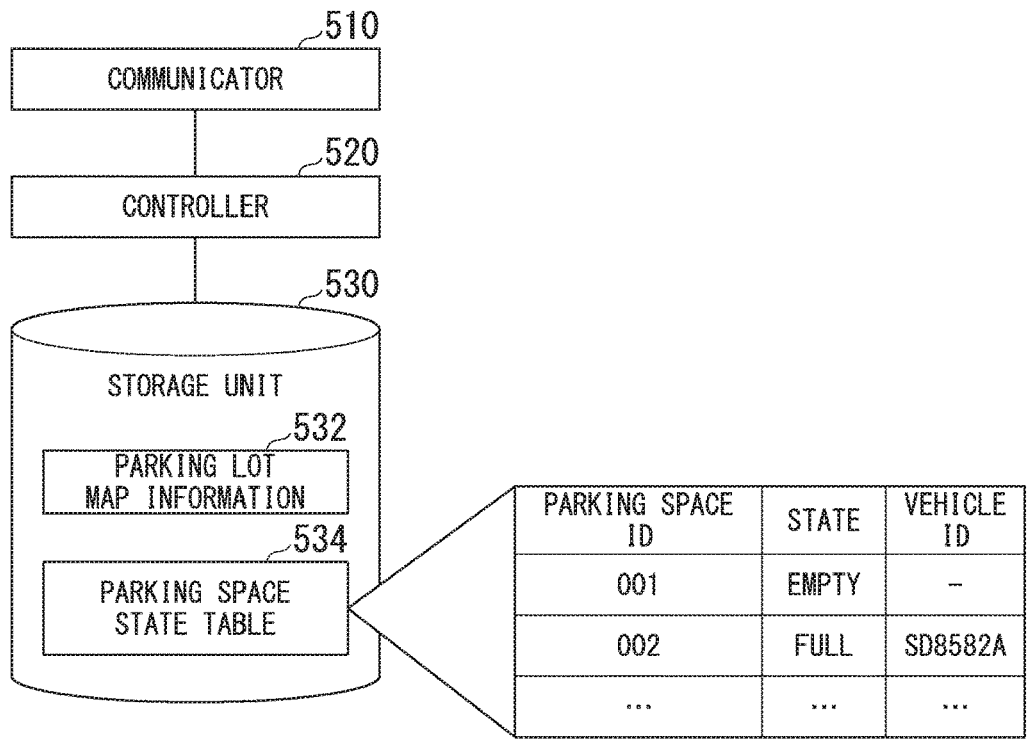
FIG. 5 is a diagram illustrating an example of a configuration of a parking lot management device.

FIG. 5 is a diagram illustrating an example of a configuration of the parking lot management device 500. The parking lot management device 500 includes, for example, a communicator 510, a controller 520, and a storage unit 530. The storage unit 530 stores parking lot map information 532 and information such as a parking space state table 534.

The communicator 510 communicates with the vehicle M and other vehicles wirelessly. The controller 520 guides a vehicle to the parking space PS on the basis of information acquired by the communicator 510 and the information stored in the storage unit 530. The parking lot map information 532 is information geometrically indicating the structure of the parking area PA. The parking lot map information 532 includes coordinates for each parking space PS. In the parking space state table 534, for example, a state indicating an empty state or a full (parked) state with respect to a parking space ID which is identification information of the parking space PS and a vehicle ID which is identification information of a parked vehicle in the case of a full state are associated with each other.

In a case where the communicator 510 receives a request for parking from a vehicle, the controller 520 refers to the parking space state table 534 to extract a parking space (empty space) PS of which the state is an empty state, acquire the position of the extracted parking space PS from the parking lot map information 532, and transmit a suitable route to the acquired position of the parking space PS to the vehicle using the communicator 510. The controller 520 instructs a specific vehicle to stop, slow down, or the like as necessary on the basis of positional relationships between a plurality of vehicles so that the vehicles do not advance to the same position simultaneously.

In the vehicle that has received a route (hereinafter referred to as the vehicle M), the self-propelled parking controller 142 generates a target trajectory based on the route. In a case where the parking space PS which is a target approaches, the parking space recognizer 132 recognizes a parking frame line or the like for partitioning the parking space PS, recognizes the detailed position of the parking space PS, and provides the recognized position to the self-propelled parking controller 142. The self-propelled parking controller 142 receives this to correct the target trajectory, and parks the vehicle M in the parking space PS.

Without being limited to the above description, the self-propelled parking controller 142 may find a parking space in an empty state by itself on the basis of a detection result performed by the camera 10, the radar device 12, the viewfinder 14, or the object recognition device 16 irrespective of communication, and park the vehicle M within the found parking space.

[Self-Propelled Parking Event—During Exit]

The self-propelled parking controller 142 and the communication device 20 maintain an operation state even while the vehicle M is parked. For example, in a case where the communication device 20 receives a request for a pickup car (a request for calling) which is an example of an exit instruction from the terminal device 300 of the occupant U, the self-propelled parking controller 142 starts up the system of the vehicle M, and moves the vehicle M to the stop area 410. In this case, the self-propelled parking controller 142 controls the communication device 20 and transmits a request for start to the parking lot management device 500. Similarly to the time of entry, the controller 520 of the parking lot management device 500 instructs a specific vehicle to stop, slow down, or the like as necessary on the basis of positional relationships between a plurality of vehicles so that the vehicles do not advance to the same position simultaneously. In a case where the vehicle M is moved to the stop area 410 and the occupant U is picked up, the self-propelled parking controller 142 stops its operation, and thereafter, manual driving or automated driving based on another functional unit is started.

In a case where the self-propelled parking event is being executed, the HMI controller 185 may generate information relating to a vehicle situation based on self-propelled parking (parking control based on automated travel), and notify the occupant U who has exited a vehicle of the generated information by transmitting the information to the terminal device 300. Examples of the information relating to a vehicle situation based on self-propelled parking include a traveling condition (entry or exit) of the vehicle M, a traveling position, an expected time of arrival at the stop area 410, a scheduled traveling route from a parking position to the stop area 410, in-vehicle temperature, and the like.

The above-described self-propelled parking event is not executed in a case where the remaining battery amount of the terminal device 300 that has performed an entry instruction or an exit instruction is insufficient. For example, the remaining amount manager 180 causes the first controller 120 and the second controller 160 to execute the self-propelled parking event in a case where the remaining battery amount of the terminal device 300 is acquired and the remaining battery amount is equal to or greater than a first threshold to be described later, and causes the HMI controller 185 to perform a predetermined notification to the occupant U without receiving an instruction for self-propelled parking in a case where the remaining battery amount is less than the first threshold.

[Notification Control Performed by HMI Controller]

Next, a specific example of notification control performed by the HMI controller 185 will be described. Hereinafter, a notification control pattern for each situation will be described.

<First Notification Control Pattern>

A first notification control pattern is a notification control pattern in a situation in which the occupant U is aboard the vehicle.

The word "aboard" refers to, for example, a state in which it is estimated by the boarding state estimator 175 that the occupant U is on board the vehicle M. In the first notification control pattern, first, the self-propelled parking predictor 170 determines whether the terminal device 300 possessed by the occupant U who is on board the vehicle M is a terminal capable of executing the self-propelled parking event of the vehicle U, and determines that there is the possibility of an execution instruction for the self-propelled parking event being performed by the terminal device 300 after the occupant U exits in a case where it is determined that the terminal device is a terminal capable of executing the self-propelled parking event. In this case, the self-propelled parking predictor 170 executes, for example, a process of accessing the terminal device 300 on the basis of address information included in the terminal information 192 stored in the storage unit 190, and determines that the terminal device is a terminal capable of executing the self-propelled parking event in a case where it is possible to access the terminal device 300.

For example, in a case where a destination (for example, a visit destination facility) is set by the navigation device 50, the self-propelled parking predictor 170 refers to the second map information 62 to acquire parking lot information associated with the destination. In a case where a parking area in which traveling based on automated driving is possible is included in the acquired parking lot information, the self-propelled parking predictor 170 may determine that there is the possibility of an execution instruction for the self-propelled parking event being performed by the terminal device 300. Instead of acquiring a destination from the navigation device 50, the self-propelled parking predictor 170 may refer to the traveling direction of the vehicle M, a traveling history (not shown) stored in the storage unit 190, or the like to predict a destination, and determine whether there is the possibility of an execution instruction for the self-propelled parking event being performed by the terminal device 300 on the basis of the parking lot information associated with the predicted destination.

In a case where information relating to a schedule to perform the self-propelled parking event is received from the HMI 30 or the terminal device 300 by the occupant U's operation, the self-propelled parking predictor 170 may determine that there is the possibility of an execution instruction for the self-propelled parking event being performed by the terminal device 300. The self-propelled parking predictor 170 may combine a plurality of determination conditions described above, and finally determine whether there is the possibility of the self-propelled parking event being performed. In a case where the above-described prediction conditions are not satisfied, the self-propelled parking predictor 170 determines that there is not the possibility of an execution instruction for the self-propelled parking event being performed by the terminal device 300.

Next, in a case where it is predicted by the self-propelled parking predictor 170 that there is the possibility of the self-propelled parking event being performed, and the remaining battery amount of the battery 360 acquired by the remaining amount manager 180 is less than the first threshold, the HMI controller 185 performs a notification to the occupant U using one or both of the HMI 30 and the terminal device 300. The first threshold is, for example, a value which is estimated to be required for communication between the vehicle M and the terminal device 300 during an instruction for entry or exit based on the self-propelled parking event and the execution of the event. The first threshold is, for example, a value at which simple communication (for example, transmission and reception of notification information several times) between the vehicle M and the terminal device 300 is estimated to be possible. The first threshold is set to be variable on the basis of, for example, the performance of the terminal device 300, the degree of deterioration of the battery 360, the size of the parking area PA, or the like. The first threshold may be set as a value obtained by adding a predetermined value (margin) to the above-described value which is estimated to be required for communication.

The HMI controller 185 generates information for prompting the occupant U to increase the remaining energy amount of the terminal device 300. The HMI controller 185 performs a notification to the occupant U by outputting the generated information to the HMI 30 or transmitting the information from the communication device 20 to the terminal device 300. The information for prompting the increase of the remaining energy amount is, for example, information for prompting charging of the battery 360 or replacement of the battery 360 (battery replacement), but may be information for prompting the increase of another remaining energy amount of the terminal device 300. Hereinafter, the description will mainly focus on an example of a notification of information for prompting charging or battery replacement.

For example, in a case where it is estimated by the boarding state estimator 175 that the occupant U performs manual driving, the occupant U is not able to see the terminal device 300. For this reason, the HMI controller 185 performs a notification to the occupant U by displaying an image for prompting charging of the terminal device 300 or battery replacement on the display device of the HMI 30. In addition, in a case where it is estimated by the boarding state estimator 175 that the occupant U does not perform manual driving (for example, performs automated driving), the image for prompting charging or battery replacement is transmitted to the terminal device 300 in addition to display of the image on the display device of the HMI 30, and the image is displayed on the display 330 of the terminal device 300, whereby it is possible to perform a notification to the occupant more reliably.

Instead of transmitting the image for prompting charging or battery replacement to the terminal device 300, the HMI controller 185 may transmit information for causing the terminal device 300 to generate an image for performing a notification for prompting charging or battery replacement to the terminal device 300, and cause the display controller 350 to generate an image. The same is true of display control of another image to be described later.

Figure 6:
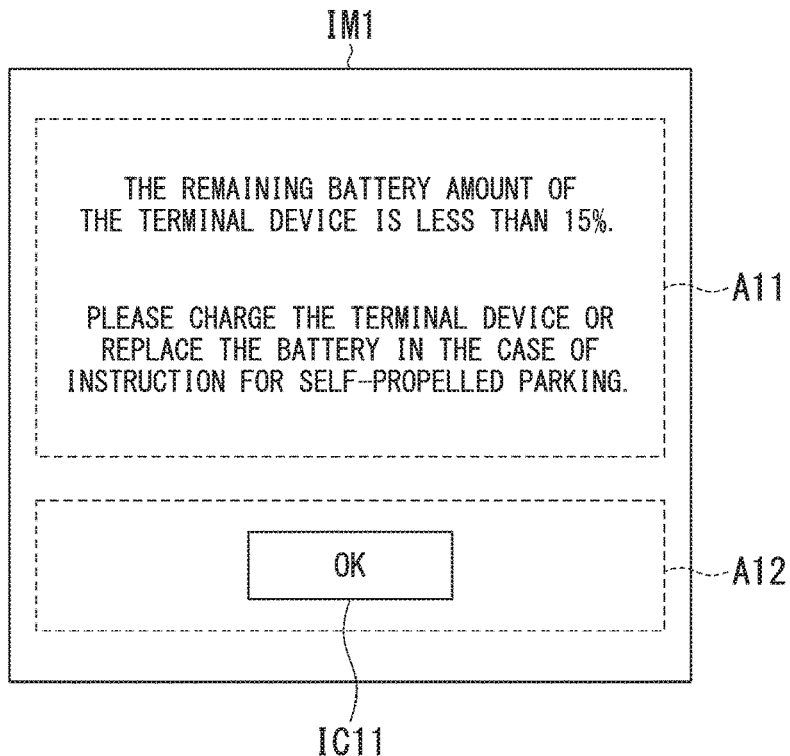
FIG. 6 is a diagram illustrating an example of an image of which an occupant aboard a vehicle is notified.

FIG. 6 is a diagram illustrating an example of an image IM1 of which an occupant aboard the vehicle is notified. The image shown in FIG. 6 shows an example of an image which is displayed on the display 330 of the terminal device 300. The same is true of an example of another image to be described later. The image IM1 includes, for example, a notification information display region A11 and a graphical user interface (GUI) switch display region A12. The notification information display region A11 displays, for example, the remaining energy amount of a vehicle battery 250 less than the first threshold, and information for prompting charging of the terminal device 300 or replacement of a battery (the battery 360). The notification information display region A11 may display the current remaining battery amount of the battery 360 acquired by the remaining amount manager 180. In the example of FIG. 6, the notification information display region A11 displays notification information such as "The remaining battery amount of the terminal device is less than 15%." and "Please charge the terminal device or replace the battery in the case of instruction for self-propelled parking." The above "15%" is an example of the first threshold.

The GUI switch display region A12 displays, for example, an icon IC11 for receiving an instruction to terminate display of the image IM1. The text of "OK" is shown on the icon IC11. The display controller 350 terminates display of the image IM1 in a case where the selection of the icon IC11 is received by the input 320.

In this manner, by displaying the image IM1, it is possible to cause the occupant U to ascertain early that instructions for entry and exit based on automated driving of the vehicle M after arrival at a visit destination facility are not able to be executed from the terminal device 300. Thereby, the occupant U can perform charging of the terminal device 300 or replacement of the battery 360 before arrival at the visit destination facility. Thereby, it is possible to suppress the situation in which communication with the terminal device that performs an instruction for self-propelled parking cannot be performed.

<Second Notification Control Pattern>

A second notification control pattern is a notification control pattern in a state in which the vehicle M arrives at the parking area PA associated with the visit destination facility, and a situation in which it is estimated that the occupant U is still aboard the vehicle M (has not exited the vehicle). Hereinafter, content that is the same as that of the other notification control pattern described above will not be described in detail. The same is true of the description of subsequent notification control patterns.

In the second control pattern, the HMI controller 185 determines that the vehicle M has arrived at the parking area PA, for example, in a case where position information of the vehicle M which is obtained from the GNSS receiver 51 or the like is included in the region of the parking area PA which is obtained from the second map information. The HMI controller 185 may determine that the vehicle M has arrived at the parking area PA in a case where the vehicle M stops in the stop area 410 or is parked in the parking space PS of the parking area PA.

The HMI controller 185 performs a notification to the occupant U using one or both of the HMI 30 and the terminal device 300 in a case where it is determined that the vehicle M has arrived at the parking area PA, it is predicted that there is the possibility of the self-propelled parking event being performed by the self-propelled parking predictor 170, it is estimated by the boarding state estimator 175 that the occupant U is on board the vehicle M (has not exited the vehicle), and charging of the terminal device 300 or battery replacement is not performed (the remaining battery amount of the terminal device 300 is less than the first threshold). In this case, the HMI controller 185 generates an image indicating that self-propelled parking according to an instruction from the terminal device 300 is not received (or is not able to be executed), and performs a notification to the occupant U by displaying the generated image from one or both of the HMI 30 and the terminal device 300.

Figure 7:
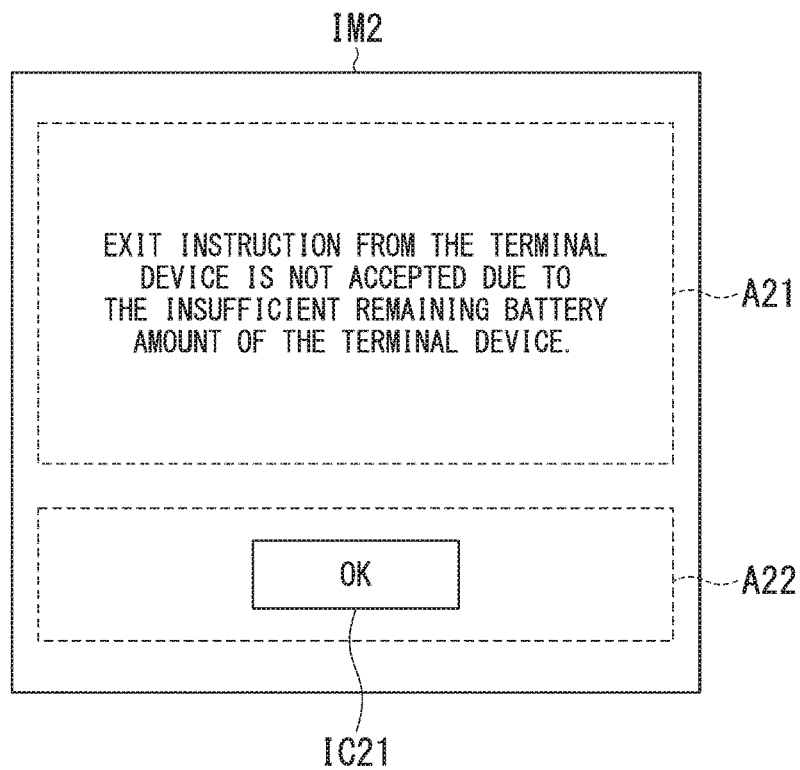
FIG. 7 is a diagram illustrating an example of an image of which an occupant who has not exited after arrival at a parking area is notified.

FIG. 7 is a diagram illustrating an example of an image IM2 of which an occupant who has not exited is notified after arrival at the parking area PA. The image IM2 includes, for example, a notification information display region A21 and a GUI switch display region A22. The notification information display region A21 displays, for example, information indicating that, since the remaining battery amount of the terminal device 300 is insufficient, a self-propelled parking instruction (an instruction for entry or exit) from the terminal device 300 to the vehicle M is not received. The notification information display region A21 may display information for prompting charging of the terminal device 300 or battery replacement. In the example of FIG. 7, the notification information display region A21 displays notification information such as "Exit instruction from the terminal device is not accepted due to the insufficient remaining battery amount of the terminal device."

The GUI switch display region A22 displays, for example, an icon IC21 for receiving an instruction to terminate display of the image IM2. The text of "OK" is shown on the icon IC21. The display controller 350 terminates display of the image IM2 in a case where the selection of the icon IC21 is received by the input 320.

In this manner, by displaying the image IM2, it is possible to cause the occupant U to ascertain that a self-propelled parking instruction based on automated driving of the vehicle M is not able to be executed from the terminal device 300 before the occupant U exits the vehicle. Thereby, for example, in a case where the vehicle M is stopped in the stop area 410, the occupant U notices that an entry instruction is not able to be performed after exit at the boarding and exit area 420, and thus it is possible to move the vehicle M to the parking space PS of the parking area PA with the occupant on board, without the occupant boarding the vehicle again and moving the vehicle M.

<Third Notification Control Pattern>

A third notification control pattern is a notification control pattern in which the vehicle M is parked in the parking area PA and the occupant U has exited the vehicle M. The wording "has exited" includes, for example, a point in time of getting off the vehicle M or a point in time when a predetermined time has elapsed after get off the vehicle M. In the third notification control pattern, it is assumed that the occupant U possesses the terminal device 300 even after exit. In a case where the remaining battery amount of the terminal device 300 acquired by the remaining amount manager 180 is less than the first threshold, the HMI controller 185 generates information indicating that an instruction for exiting (calling) of the vehicle M is not able to be performed in the terminal device 300, and performs a notification to the occupant by transmitting the generated information to the terminal device 300. The HMI controller 185 performs the above-described notification when the remaining battery amount is less than the first threshold due to use or the like of the terminal device 300 after exit. The HMI controller 185 may acquire a remaining battery amount when the vehicle cooperation application 382 is started up or when an exit instruction is input, and perform the above-described notification in a case where the acquired remaining battery amount is less than the first threshold.

Figure 8:
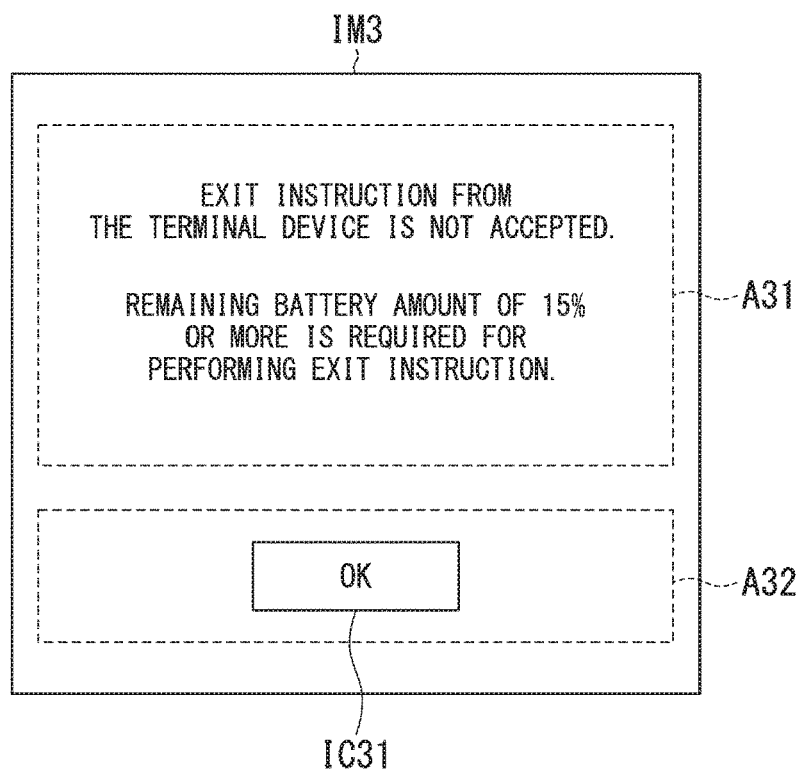
FIG. 8 is a diagram illustrating an example of an image of which an occupant after exit is notified.

FIG. 8 is a diagram illustrating an example of an image IM3 indicating that self-propelled parking is not able to be executed after exit. The image IM3 includes, for example, a notification information display region A31 and a GUI switch display region A32. The notification information display region A31 displays, for example, that an exit instruction from the terminal device 300 cannot be performed, and information indicating a remaining battery amount for performing an exit instruction. In the example of FIG. 8, the notification information display region A31 displays notification information such as "Exit instruction from the terminal device is not accepted." and "Remaining battery amount of 15% or more is required for performing exit instruction."

The GUI switch display region A32 displays, for example, an icon IC31 for receiving an instruction to terminate display of the image IM3. The text of "OK" is shown on the icon IC31. The display controller 350 terminates display of the image IM3 in a case where the selection of the icon IC31 is received by the input 320.

In this manner, it is possible to cause the occupant U to ascertain reliably that an exit instruction from the terminal device 300 is not able to be executed by displaying the image IM3, and to prompt charging of the terminal device 300 or battery replacement by notifying the occupant of a remaining battery amount required for performing an exit instruction.

In the third notification control pattern, the HMI controller 185 may determine whether the remaining battery amount of the terminal device 300 is less than a second threshold in addition to the above-described process, and perform a notification for warning an occupant beforehand that an instruction for exiting of the vehicle M is not able to be performed in a case where the remaining battery amount is less than the second threshold. The second threshold is, for example, a value larger than the first threshold. The second threshold may be a value obtained by adding a fixed value (for example, +5 [%]) to the first threshold, or may be a value obtained by adding a value derived on the basis of the use status (for example, the amount of decrease in a remaining battery amount per predetermined time) of the terminal device 300 to the first threshold.

Figure 9:
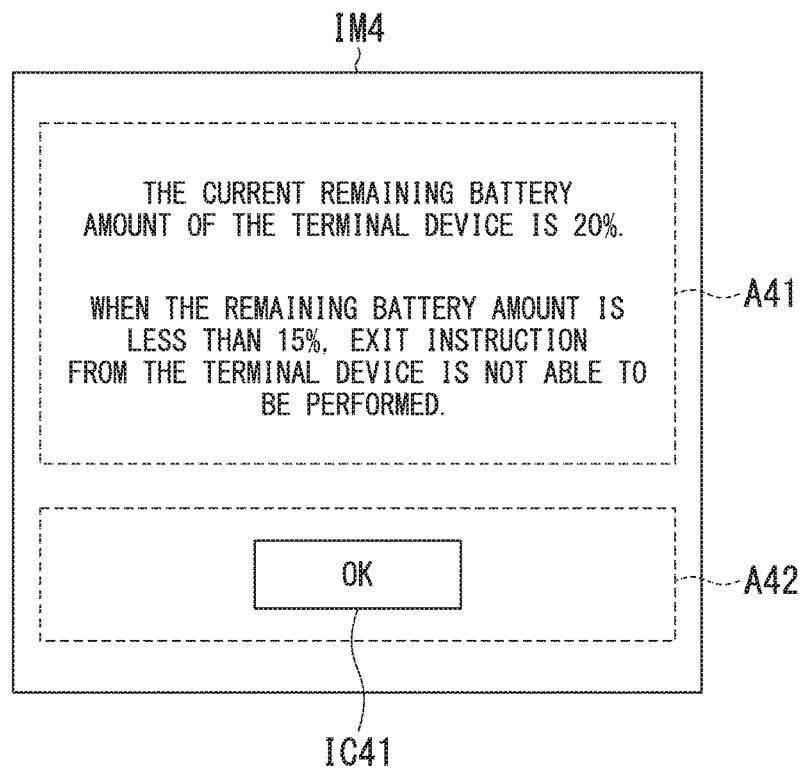
FIG. 9 is a diagram illustrating an example of an image relating to a warning notification.

FIG. 9 is a diagram illustrating an example of an image IM4 relating to a warning notification. The image IM4 includes, for example, a notification information display region A41 and a GUI switch display region A42. The notification information display region A41 displays, for example, the current remaining battery amount of the terminal device 300 and information indicating a remaining battery amount for perform an exit instruction. In the example of FIG. 9, the notification information display region A41 displays notification information such as "The current remaining battery amount of the terminal device is 20%." and "When the remaining battery amount is less than 15%, exit instruction from the terminal device is not able to be performed." The above "20%" is an example of the second threshold.

The GUI switch display region A42 displays, for example, an icon IC41 for receiving an instruction to terminate display of the image IM4. The text of "OK" is shown on the icon IC41. The display controller 350 terminates display of the image IM4 in a case where the selection of the icon IC41 is received by the input 320.

In this manner, by displaying the image IM4, it is possible to cause the occupant U to ascertain information relating to the remaining battery amount before an exit instruction from the terminal device 300 is not able to be executed. Thereby, it is possible to cause the occupant U to suppress use of the terminal device 300, or to prompt charging of the terminal device 300 or battery replacement. Thereby, it is possible to maintain a state in which the vehicle M and the terminal device 300 can communicate with each other.

In the third notification control pattern, in a case where the vehicle M is caused to enter the parking area PA by self-propelled parking, there is the possibility of the occupant not being able to ascertain its parking position. Consequently, in a case where the remaining battery amount of the terminal device 300 is less than the first threshold, the HMI controller 185 may notify the occupant U of information relating to a parking position in addition to an exit instruction not being able to be performed.

Figure 10:
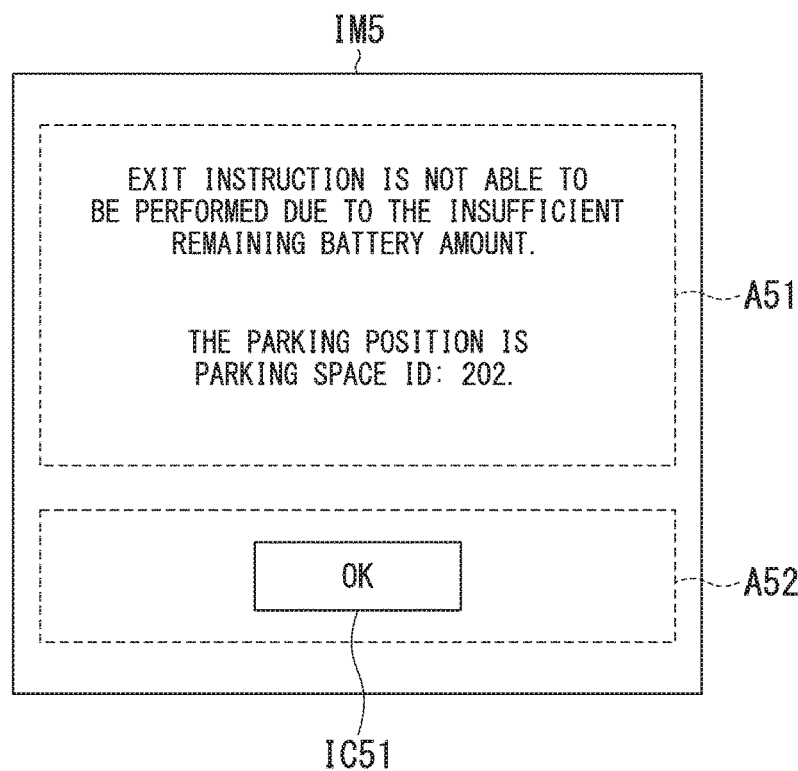
FIG. 10 is a diagram illustrating an example of an image including information relating to a parking position.

FIG. 10 is a diagram illustrating an example of an image IM5 including information relating to a parking position. The image IM5 includes, for example, a notification information display region A51 and a GUI switch display region A52. In the example of FIG. 10, the notification information display region A51 displays notification information of "Exit instruction is not able to be performed due to the insufficient remaining battery amount." and "The parking position is parking space ID: 202." The HMI controller 185 may transmit information relating to a parking position to the terminal device 300 during entry or at a timing when entry is completed and notify the occupant U of the information.

The GUI switch display region A52 displays, for example, an icon IC51 for receiving an instruction to terminate display of the image IM5. The text of "OK" is shown on the icon IC51. The display controller 350 terminates display of the image IM5 in a case where the selection of the icon IC51 is received by the input 320.

In this manner, by displaying the image IM5, it is possible to cause the occupant U to ascertain the parking position of the vehicle M. Therefore, even in a situation in which an exit instruction from the terminal device 300 is not able to be performed, it is possible for the occupant U to move to the parking position of the vehicle M, and to cause the vehicle to exit the parking area PA by manual driving after boarding.

In the third notification control pattern, the HMI controller 185 may acquire information relating to the parking area of the vehicle M, determine whether the parking area is a specific parking area of an occupant's home or the like (that is, a parking area in which the occupant can easily specify the parking position of the vehicle M), and make content of the image (that is, a notification aspect) displayed on the notification information display region A51 of FIG. 10 different in the case of a specific parking area. In this case, for example, in a case where the parking area is a parking area of the occupant's home, the notification information display region A51 simply displays only notification information of "Exit instruction is not able to be performed due to the insufficient remaining battery amount." Thereby, the HMI controller 185 can suppress a notification of too much information, and notify the occupant of only necessary information.

In the third notification control pattern, in a case where the remaining battery amount of the terminal device 300 is equal to or greater than the first threshold after the above-described notification shown in FIG. 8 or 10 is performed, the HMI controller 185 may generate information indicating that an exit instruction from the terminal device 300 is able to be performed (the remaining battery amount is returned to a state in which an exit instruction is able to be performed), transmit the generated information to the terminal device 300, and perform a notification to the occupant U.

Figure 11:
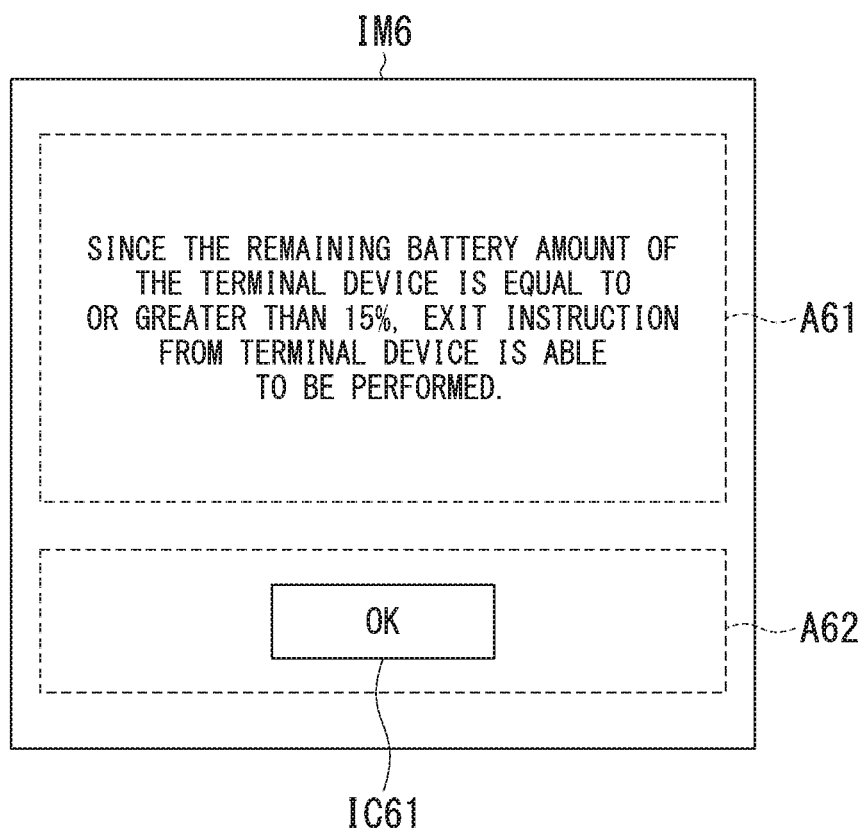
FIG. 11 is a diagram illustrating an example of an image indicating an exit instruction is able to be performed.

FIG. 11 is a diagram illustrating an example of an image IM6 indicating that an exit instruction is able to be performed. The image IM6 includes, for example, a notification information display region A61 and a GUI switch display region A62. For example, since the remaining battery amount is equal to or greater than the first threshold, the notification information display region A61 displays information indicating that an exit instruction is able to be performed. In the example of FIG. 11, the notification information display region A61 displays notification information of "Since the remaining battery amount of the terminal device is equal to or greater than 15%, exit instruction from terminal device is able to be performed."

The GUI switch display region A62 displays, for example, an icon IC61 for receiving an instruction to terminate display of the image IM6. The text of "OK" is shown on the icon IC61. The display controller 350 terminates display of the image IM6 in a case where the selection of the icon IC61 is received by the input 320.

In this manner, by displaying the image IM6, it is possible to cause the occupant U to easily ascertain that an exit instruction from the terminal device 300 is able to be performed.

In a case where an exit instruction from the terminal device 300 is performed after the remaining battery amount of the terminal device 300 is returned to the first threshold or greater, the remaining amount manager 180 receives the exit instruction from the terminal device 300, and causes the first controller 120 and the second controller 160 to execute the self-propelled parking event during exit.

The HMI controller 185 may perform a notification by combining each of the above-described images IM1 to IM6 with some or all of other images. The HMI controller 185 may generate voice information corresponding to content displayed in the information display regions A11 to A61 instead of (or in addition to) control for causing the terminal device 300 or the HMI 30 to display the above-described images IM1 to IM6, and perform control for outputting the generated voice information from the speaker or the like of the terminal device 300 or the HMI 30. The notifications based on the images IM1 to IM6 may be repeatedly performed at a predetermined timing under a situation in which each notification condition is satisfied, or notifications of a predetermined number of times or less may be repeatedly performed.

[Process Flow]

Figure 12:
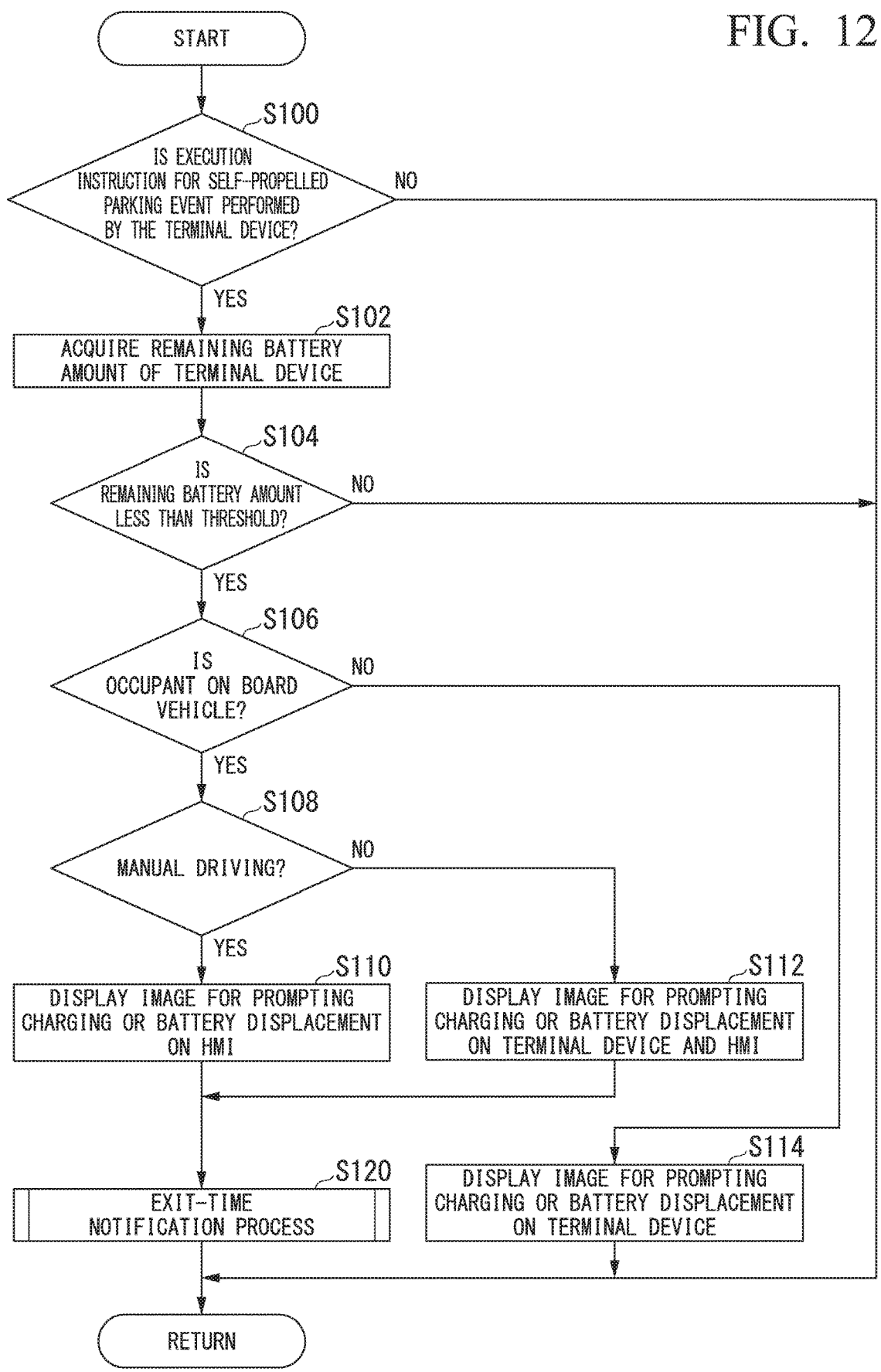
FIG. 12 is a flow chart illustrating an example of a flow of processes which are executed by an automated driving control device of the embodiment.

FIG. 12 is a flow chart illustrating an example of a flow of processes which are executed by the automated driving control device 100 of the embodiment. The processes of FIG. 12 show a flow of processes mainly relating to notification control which is executed by the automated driving control device 100. The processing of the present flow chart may be repeatedly executed, for example, with a predetermined period or at a predetermined timing.

First, the self-propelled parking predictor 170 determines whether an execution instruction for the self-propelled parking event is performed by the terminal device 300 (step S100). In a case where it is determined that the execution instruction for the self-propelled parking event is performed by the terminal device 300, the remaining amount manager 180 acquires the remaining battery amount of the terminal device 300 (step S102). Next, the HMI controller 185 determines whether the acquired remaining battery amount of the terminal device 300 is less than a threshold (step S104).

In a case where the remaining battery amount is less than the threshold, the HMI controller 185 determines whether the occupant U is on board the vehicle M on the basis of content estimated by the boarding state estimator 175 (step S106). In a case where it is determined that the occupant U is on board the vehicle M, the HMI controller 185 determines whether the occupant U is driving manually on the basis of the content estimated by the boarding state estimator 175 (step S108). In a case where it is determined that the occupant U is driving manually, the HMI controller 185 causes the display device of the HMI 30 to display an image for prompting charging of the terminal device 300 or battery replacement (step S110). In the process of step S108, in a case where it is determined that the occupant is not driving manually, the HMI controller 185 causes the display 330 of the terminal device 300 and the display device of the HMI 30 to display an image for prompting charging of the terminal device 300 or battery replacement (step S112). In the process of step S106, in a case where it is determined that the occupant U is not on board, the HMI controller 185 displays an image for prompting charging of the terminal device 300 or battery replacement on the terminal device 300 (step S114).

After the process of step S110 or step S112, the HMI controller 185 executes an exit-time notification process (step S120). Thereby, the processing of the present flow chart is terminated. in a case where it is determined that the execution instruction for the self-propelled parking event is not performed by the terminal device 300 in the process of step S100, or in a case where it is determined that the remaining battery amount is not less than the threshold in the process of step S104, the processing of the present flow chart is terminated.

Figure 13:
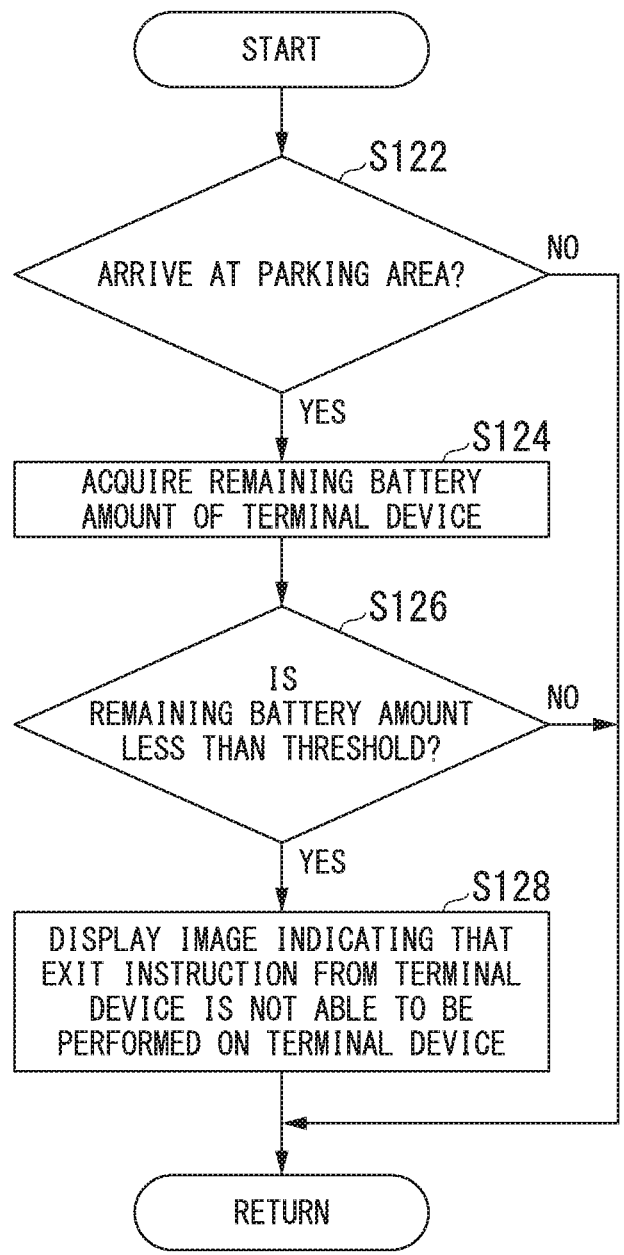
FIG. 13 is a flow chart illustrating an example of a flow of an exit-time notification process of step S120.

FIG. 13 is a flow chart illustrating an example of a flow of the exit-time notification process of step S120. In the example of FIG. 13, the HMI controller 185 determines whether the vehicle M arrives at the parking area which is a destination (step S122). In a case where the vehicle arrives at the parking area, the remaining amount manager 180 acquires the remaining battery amount of the terminal device 300 (step S124). Next, the HMI controller 185 determines whether the remaining battery amount is less than the threshold (step S126). In a case where it is determined that the remaining battery amount is less than the threshold, the HMI controller 185 causes the terminal device 300 to display an image indicating that the exit instruction from the terminal device 300 is not able to be performed (step S128).

Thereby, the processing of the present flow chart is terminated. In a case where it is determined that the vehicle M does not arrive at the parking area in the process of step S122, or in a case where it is determined that the remaining battery amount is not less than the threshold in the process of step S126, the processing of the present flow chart is terminated.

According to the vehicle control system of the above-described embodiment, it is possible to suppress a situation in which communication with the terminal device 300 that performs an instruction for parking cannot be performed by including the recognizer 130 that recognizes the peripheral environment of the vehicle M, a driving controller that performs driving control based on speed control and steering control of the vehicle M (the first controller 120 and the second controller 160) on the basis of the recognition result of the recognizer 130, the remaining amount manager (an example of an acquirer) 180 that acquires the remaining battery amount of the terminal device 300, and a notifier that performs a notification for prompting charging of the terminal device 300 or battery replacement (the communication device 20 and the HMI controller 185) when the remaining battery amount acquired by the remaining amount manager 180 is less than the first threshold in a case where an instruction to cause the vehicle M to enter a parking area in which the vehicle is able to be parked by traveling based on the driving control or an instruction to cause the vehicle M to exit the parking area is performed by the terminal device 300. Therefore, for example, it is possible for the occupant to transmit an instruction for self-propelled parking from the terminal device 300 to the vehicle M, and to confirm notification content from the vehicle M displayed on the display 330. Thereby, it is possible to acquire the state of a vehicle in self-propelled parking from the terminal device 300.

Modification Example

In the above-described embodiment, in a case where a plurality of terminal devices can perform an instruction for self-propelled parking with respect to the vehicle M, the remaining amount manager 180 may acquire the remaining battery amounts of the plurality of terminal devices. In this case, in a case where the remaining battery amounts of all terminal devices are less than the first threshold, the HMI controller 185 performs a notification for prompting charging or battery replacement to one or a plurality of terminal devices specified in advance among the above-described plurality of terminal devices. In a case where the remaining battery amounts of one or more terminal devices among a plurality of terminal devices are equal to or greater than the first threshold, the remaining amount manager 180 may execute self-propelled parking on the basis of an instruction for self-propelled parking from the terminal devices.

Some or all of the functions of the self-propelled parking predictor 170, the remaining amount manager 180, and the HMI controller 185 in the automated driving control device 100 of the above-described embodiment may be provided in the terminal device 300.

In the above-described embodiment, the remaining amount manager 180 may acquire the remaining energy amount of the vehicle M. The remaining energy amount of the vehicle M is, for example, the remaining battery amount of a vehicle battery mounted in a vehicle or the remaining amount of fuel such as gasoline. In a case where the remaining energy amount of the vehicle M acquired by the remaining amount manager 180 is less than a predetermined threshold, the HMI controller 185 performs a notification to the occupant U by outputting information for prompting charging of the vehicle battery or replenishment of fuel to one or both of the HMI 30 and the terminal device 300. Thereby, it is possible to suppress stop of a vehicle during the execution of the self-propelled parking event (during entry or exit) due to the energy shortage of the vehicle M, or a situation in which communication with the terminal device 300 cannot be performed.

[Hardware Configuration]

Figure 14:
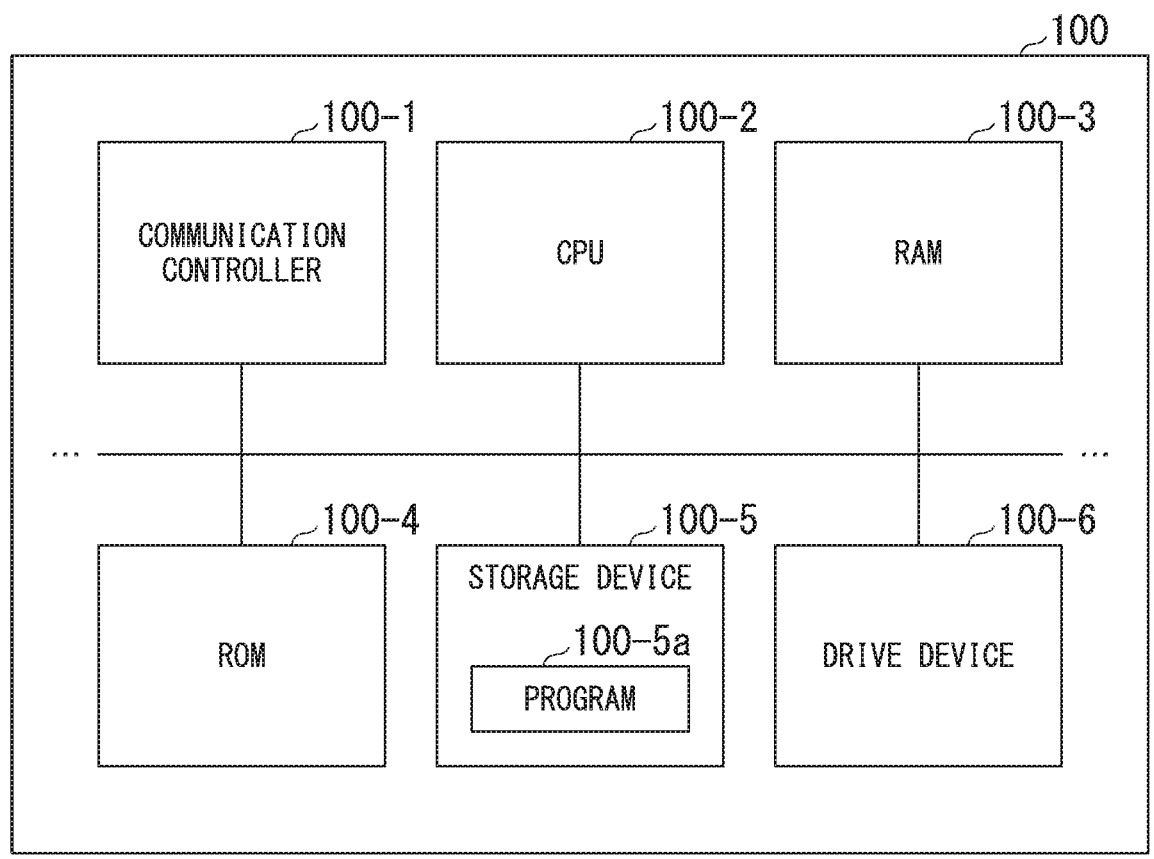
FIG. 14 is a diagram illustrating an example of a hardware configuration of the automated driving control device of the embodiment.

FIG. 14 is a diagram illustrating an example of a hardware configuration of the automated driving control device 100 of the embodiment. As shown in the drawing, the automated driving control device 100 is configured such that a communication controller 100-1, a CPU 100-2, a RAM 100-3 used as a working memory, a ROM 100-4 that stores a boot program or the like, a storage device 100-5 such as a flash memory or an HDD, a drive device 100-6, and the like are connected to each other through an internal bus or a dedicated communication line. The communication controller 100-1 performs communication with components other than the automated driving control device 100. The drive device 100-6 has a portable storage medium such as an optical disc (for example, a computer readable non-transitory storage medium) mounted therein. The storage device 100-5 stores a program 100-5a executed by the CPU 100-2. This program is developed into the RAM 100-3 by a direct memory access (DMA) controller (not shown) or the like, and is executed by the CPU 100-2. The program 100-5a which is referred to by the CPU 100-2 may be stored in a portable storage medium mounted in the drive device 100-6, or may be downloaded from other devices through a network. Thereby, some or all of the functions of the automated driving control device 100 are realized.

The above-described embodiment can be represented as follows.

A vehicle control system including:
a storage device having a program stored therein; and
a hardware processor,
wherein the hardware processor executes the program stored in the storage, to thereby
recognize a peripheral environment of a vehicle,
perform driving control based on speed control and steering control of the vehicle on the basis of a recognition result,
acquire a remaining energy amount of a terminal device, and
perform a notification for prompting an increase of the remaining energy amount when the acquired remaining energy amount is less than a first threshold in a case where an instruction to cause a vehicle to enter a parking area in which the vehicle is able to be parked by traveling based on the driving control or an instruction to cause the vehicle to exit the parking area is performed by the terminal device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A vehicle control system comprising:
a recognizer that recognizes a peripheral environment of a vehicle;

a driving controller that performs driving control based on speed control and steering control of the vehicle on the basis of a recognition result of the recognizer;

an acquirer that acquires a remaining energy amount of a terminal device; and a notifier that performs a notification for prompting an increase of the remaining energy amount when the remaining energy amount acquired by the acquirer is less than a first threshold in a case where an instruction to cause a vehicle to enter a parking area in which the vehicle is able to be parked by traveling based on the driving control or an instruction to cause the vehicle to exit the parking area is performed by the terminal device.

2. The vehicle control system according to claim 1, wherein, in a case where the vehicle arrives at the parking area without the increase of the remaining energy amount while an occupant is aboard the vehicle, the notifier notifies that the driving control according to an instruction from the terminal device is not able to be executed before the occupant exits the vehicle.

3. The vehicle control system according to claim 1, wherein the notifier performs the notification to one or both of the vehicle and the terminal device.

4. The vehicle control system according to claim 1, wherein the acquirer acquires a remaining energy amount of a terminal device after an occupant exits the vehicle, and the notifier notifies the terminal device that an instruction for exiting of the vehicle is not able to be performed when the remaining energy amount is less than the first threshold.

5. The vehicle control system according to claim 4, wherein the notifier performs a notification for warning the terminal device that the instruction for exiting of the vehicle is not able to be performed when the remaining energy amount is less than a second threshold larger than the first threshold.

6. The vehicle control system according to claim 4, wherein the notifier notifies the terminal device of information relating to a remaining energy amount with which the instruction for exiting of the vehicle is able to be performed.

7. The vehicle control system according to claim 4, wherein the notifier notifies the terminal device of information relating to a parking position of the vehicle.

8. The vehicle control system according to claim 4, wherein the notifier notifies the terminal device that the instruction for exiting of the vehicle is able to be performed when the remaining energy amount acquired by the acquirer is equal to or greater than the first threshold after the terminal device is notified that the instruction for exiting of the vehicle is not able to be performed.

9. The vehicle control system according to claim 1, wherein the driving controller causes the vehicle to exit the parking area by the driving control in a case where the exiting instruction from the terminal device is received when the remaining energy amount acquired by the acquirer is equal to or greater than the first threshold.

10. A vehicle control method comprising causing a computer to:

recognize a peripheral environment of a vehicle;

perform driving control based on speed control and steering control of the vehicle on the basis of a recognition result, acquire a remaining energy amount of a terminal device; and perform a notification for prompting an increase of the remaining energy amount when the acquired remaining energy amount is less than a first threshold in a case where an instruction to cause a vehicle to enter a parking area in which the vehicle is able to be parked by traveling based on the driving control or an instruction to cause the vehicle to exit the parking area is performed by the terminal device.

11. A computer readable non-transitory storage medium having a program stored therein, the program causing a computer to:

recognize a peripheral environment of a vehicle;

perform driving control based on speed control and steering control of the vehicle on the basis of a recognition result, acquire a remaining energy amount of a terminal device; and perform a notification for prompting an increase of the remaining energy amount when the acquired remaining energy amount is less than a first threshold in a case where an instruction to cause a vehicle to enter a parking area in which the vehicle is able to be parked by traveling based on the driving control or an instruction to cause the vehicle to exit the parking area is performed by the terminal device.

* * * * *